(12) United States Patent
Xu (10) Patent No.: US 7,965,938 B2
(45) Date of Patent: Jun. 21, 2011

(54) METHOD FOR MESH OPTICAL NETWORK SERVICE RESTORATION

(75) Inventor: Yonglian Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 907 days.

(21) Appl. No.: 11/568,766

(22) PCT Filed: Sep. 9, 2005

(86) PCT No.: PCT/CN2005/001445
§ 371 (c)(1),
(2), (4) Date: Nov. 6, 2006

(87) PCT Pub. No.: WO2006/026930
PCT Pub. Date: Mar. 16, 2006

(65) Prior Publication Data
US 2009/0310960 A1    Dec. 17, 2009

(30) Foreign Application Priority Data

Sep. 10, 2004    (CN) .................. 2004 1 0073787

(51) Int. Cl.
*G02F 1/00* (2006.01)
*G02F 2/00* (2006.01)
(52) U.S. Cl. .............. 398/5; 398/4; 398/12; 398/19
(58) Field of Classification Search .......... 398/5, 4, 398/3, 2, 12, 19
See application file for complete search history.

(56) References Cited

U.S. PATENT DOCUMENTS

| | | | |
|---|---|---|---|
| 5,986,783 A | 11/1999 | Sharma et al. | 359/119 |
| 6,952,395 B1 * | 10/2005 | Manoharan et al. | 370/219 |
| 7,103,044 B1 * | 9/2006 | Keller et al. | 370/392 |
| 7,652,983 B1 * | 1/2010 | Li et al. | 370/217 |
| 2002/0089712 A1 | 7/2002 | Kang et al. | 359/110 |
| 2004/0109687 A1 | 6/2004 | Park et al. | 398/57 |
| 2009/0310960 A1 | 12/2009 | Xu | 398/4 |

FOREIGN PATENT DOCUMENTS

| | | |
|---|---|---|
| CN | 1275277 (A) | 11/2000 |
| CN | 1499747 A | 5/2004 |
| CN | 200410073787.0 | 12/2009 |

(Continued)

OTHER PUBLICATIONS

Sengupta, S., et al., "From Network Design to Dynamic Provisioning and Restoration in Optical Cross-Connect Mesh Networks and Algorithmic Overview," IEEE, pp. 46-54 (Jul./Aug. 2001).

(Continued)

*Primary Examiner* — M. R. Sedighian
(74) *Attorney, Agent, or Firm* — Ladas & Parry, LLP (57) ABSTRACT

This invention discloses a method for mesh restoration, which includes the steps of: a) reserving channel resource for restoration path in the link by which the path passes and assigning discriminator for each channel, and determining the associated signaling channels for transporting the discriminator; b) when detecting the work path fails, activating the restoration path of the work path according to the discriminator which is transported by the associated signaling channel and whose value corresponds to a restoration. Using the method of the invention, the problem in rapid mesh restoration can be solved, and the speed of mesh restoration is comparable to that of the ring network protection.

24 Claims, 4 Drawing Sheets

FOREIGN PATENT DOCUMENTS

EP             1411666 A2     4/2004

OTHER PUBLICATIONS

Zhou, D., "Efficient Reosource Allocation in Self Healing Multiprotocol Label Switching Mesh Networks," IEEE, pp. 2671-2675 (2001).

English-language translation of Written Opinion of the International Searching Authority issued in PCT Application No. PCT/CN2005/001445 on Dec. 29, 2005.

First Office Action issued in the priority Chinese Application No. CN 200410073787.0 on Apr. 11, 2008, with its English-language translation.

CCAMP GMPLS P&R Design Team, "RSVP-TE Extensions in support of End-to-End GMPLS-based Recovery," J.P.Lang, et al., May 2004, p. 1-34.

CCAMP GMPLS P&R Design Team, "RSVP-TE Extensions in support of End-to-End GMPLS-based Recovery," J.P.Lang, et al., Mar. 2004, p. 1-37.

International Telecommunication Union, "Types and characteristics of SDH network protection architectures," ITU-T Recommendation G.841, Oct. 1998, p. 1-132.

International Telecommunication Union, "Architecture for the automatically switched optical network (ASON)," ITU-T Recommendation G.8080/Y.1304, Nov. 2001, p. 1-40.

\* cited by examiner

Fig.1

Fig.2 x Domestically used byte

• Medium related byte

METHOD FOR MESH OPTICAL NETWORK SERVICE RESTORATION

This application is a national phase application under 35 U.S.C. §371 of International Application No. PCT/CN2005/001445 filed 9 Sep. 2005, which claims priority to Chinese Pat. Application No.; 2004100073787.0 filed 10 Sep. 2004. The entire text of each of the above-referenced disclosure is specifically incorporated herein by reference without disclaimer.

FIELD OF THE INVENTION

The present invention relates to a method for implementing optical network service restoration, and more particularly to a method for implementing mesh optical network (hereinafter referred to as MESH) service restoration.

BACKGROUND OF THE INVENTION

Conventional optical transport networks, including Synchronous Digital Hierarchy (SDH) used outside North America and Synchronous Optical Network (SONET) used in North America, are all service providing means based on manual operation, and the protection methods are all fixed protection method based on ring network or line. Here the service refers to network connection, and thus the optical network service means optical network connection. With the rapid development of data services represented by the Internet, the requirement on transmission bandwidth expands constantly, and the operating mode in which the service is provided manually and the ring network protection method become more and more inadaptable to the requirement of the service.

In this context, the Internet Engineering Task Force (IETF) has extended the control plane protocol originally used for data exchange in a packet switched network, Multiple Protocol Label Switching, so as to be used in an optical network, which is known as Generalized Multiple Protocol Label Switching (GMPLS). The GMPLS is a set of protocols based on the IP technologies, including automatic discovery, routing and signaling protocols, which as the control plane basis of the optical network, supports automatic providing of optical connection and network failure restoration.

The GMPLS introduces a new Link Management Protocol (LMP) to support link automatic discovery; the connection relationship of the adjacent network elements can be obtained through the link automatic discovery, thereupon the information can be issued to other network elements in the network through a routing protocol. In GMPLS, link state advertisement is implemented through extending "Open Shortest Path First—Traffic Engineering (OSPF-TE)"; then an end-to-end supporting network connection is established through extending "Resource Reservation Protocol-Traffic Engineering (RSVP-TE)" or "Constraint based Routing Label Distribution Protocol (CR-LDP)".

The International Telecommunication Union-Telecommunication Standardization Sector (ITU-T) assigns the standardization work of the control plane of optical network to its Study Group 15 (SG15), which unifies the standardization work of the control plane of optical network as "Automatically Switched Optical Network (ASON)". ASON focuses mainly on making standards in terms of the requirement, framework and interface of the control plane of optical network, and a standard system with the ITU-T recommendation G.8080 as the core was gradually formed. It needs to be pointed out that the ASON standard itself does not include implementation of a protocol layer. ASON adopts a protocol of other standardization organizations, for example, the GMPLS protocol as the protocol basis.

Conventional ring network protection means, for example, a shared Multiplex Section Protection Ring (MSPRing) can provide a service restoration time of 50 ms, but need to reserve 50% of the bandwidth for protection, resulting in a low utilization ratio of bandwidth. A more serious problem with the ring network is the limitation introduced by the ring network, since it is required that the capacities of the links contained in the shared Multiplex Section Protection Ring must be consistent with each other, if the capacity of at least one link on the ring is used up, it should be implemented a capacity-expansion processing. There are two methods to implement capacity-expansion: (1) upgrading the capacity of the ring (for example, upgrading a ring from STM-16 to STM-64), during the process of which, the current services on the ring need to be rerouted; (2) establishing another ring and bearing the services that cannot be accommodated by the original multiplex section ring onto the new ring, but such a method in which parallel rings are employed brings about difficulties in maintenance and management. In summary, a ring network suffers from problems of such as low utilization ratio of bandwidth and inconvenient capacity-expansion, which can not meet the requirement on transporting data services with fast-varying traffic.

In an ASON, by introducing a control plane, the traffic affected by a network failure can be restored dynamically through rerouting; through MESH networking, the ASON can support restoration of multiple failures and provide higher service reliability. For a MESH, the planning thereof is directly driven by service and the corresponding link bandwidth can be planned according to end-to-end traffic, which is more convenient and flexible compared with a ring network. Combining with wave division technology (DWDM), the ASON can dynamically change network topology in response to the variation in traffic demand and meet the requirement of data service very well. The ASON based on a GMPLS control plane has the above-mentioned advantage of flexibility, but at present, the problem is in that the restoration time for implementing rerouting according to Resource Reservation Protocol-Traffic Engineering (RSVP-TE) is on the order of second, which can not meet the requirements of the operators, saying nothing of the requirement of voice service for a protection time of 50 ms. The problem of long restoration time of an existing MESH hinders the operators from adopting the ASON based on MESH networking.

To solve the problems in restoration reliability and restoration speed of a MESH, the "RSVP-TE Extensions in support of End-to-End GMPLS-based Recovery" draft drawn by the Common Control and Measurement Plane (CCAMP) workgroup of the IETF presents a mechanism of "shared-mesh-restoration". The basic idea is to find a restoration path uncorrelated to the failure on the working path for connection while establishing the working path. The working path operates signaling, reserves resources, establishes cross connections and provides end-to-end service transport ability; while the restoration path runs signaling, reserves resources but does not establish cross connections, thus the resources on the restoration path can be shared and used for protecting multiple failure-uncorrelated working paths. When a working path fails, the establishment of a cross connection of the corresponding restoration path is triggered through signaling. Specifically, this process can be divided into two main steps: the first step is to implement link resource reservation in the network elements on the restoration path, and the second step is to drive the network elements on the restoration path to establish a cross connection to activate the restoration path after the working path fails. The first step is accomplished before a failure occurs, without a real-time requirement; while the interrupt time of the service is affected by the accomplishing speed of the second step, which thus has a real-time requirement. The two steps of all the existing MESH restoration solutions are accomplished by driving through a massage-based protocol (e.g., the GMPLS extended RSVP-TE protocol) of the control plane, instead of by a bit-based protocol similar to that for Multiplex Section Ring Protection. It needs more complicated software to support the message-based protocol, and needs coordination among multiple tasks of the operating system to implement the operations based on a protocol; compared with the bit-based protocol, the operations of the message-based protocol takes more time, and the jitter of the accomplishing time is greater, whereby the real-time nature in establishing the restoration path in the second step is affected. Therefore, although the time for establishing a restoration path with reserved resources is shorter than that for the dynamical restoration without reserved resources, it is still very difficult to achieve a restoration time of 50-200 ms through signaling transported via IP; especially in the case of a large number of path restorations due to a failure on a high-capacity link, it is difficult to ensure the restoration time.

SUMMARY OF THE INVENTION

An object of the present invention is to provide a method for restoring service in a MESH, so as to eliminate the disadvantage of low restoration speed for a prior art MESH.

To achieve the object of the present invention, there is provided a method for MESH restoration according to an aspect of the present invention, including the steps of: a) reserving channel resources for a restoration path on the link or links through which the restoration path passes and assigning discriminators for individual channels, and determining the associated signaling channels for transporting the discriminators; b) activating the restoration path of the working path according to a discriminator whose value corresponds to a restoration, transported by the associated signaling channel, when detecting that the working path fails.

Preferably, the restoration path is activated according to the following steps of: 1) searching the next network element of the restoration path by the ingress network element of the restoration path, transmitting a discriminator whose value corresponds to a restoration to the next network element through the associated signaling channel, and then establishing a cross connection; 2) searching the still next network element according to the value of the discriminator corresponding to a restoration if the next network element is an intermediate network element, transmitting the discriminator whose value corresponds to a restoration to the still next network element, and then establishing a cross connection, until the egress network element of the restoration path receives the discriminator whose value corresponds to a restoration, and going to step 3), or going to step 3) directly if the next network element is the egress network element; 3) establishing a cross connection by the egress network element.

Alternatively, the restoration path is activated according to the following steps of: 1) searching the next network element of the restoration path by the ingress network element of the restoration path, establishing a cross connection, and then transmitting a discriminator whose value corresponds to a restoration to the next network element through the associated signaling channel; 2) searching the still next network element according to the value of the discriminator corresponding to a restoration if the next network element is an intermediate network element of the restoration path, establishing a cross connection, and then transmitting the discriminator whose value corresponds to a restoration to the still next network element, until the egress network element of the restoration path receives the discriminator whose value corresponds to a restoration, and going to step 3), or going to step 3) directly if the next network element is the egress network element; 3) establishing a cross connection by the egress network element.

The method further includes a step of: transmitting information confirming the restoration path is accomplished, in the direction opposite to the restoration path, by the egress network element.

The information refers to the value of a discriminator corresponding to a restoration.

Said establishing a cross connection refers to: the ingress network element implementing a bridge in the forward direction of the connection, and switching the cross to the restoration path in the reverse direction of the connection; an intermediate network element establishing a bidirectional cross connection; the egress network element switching the cross to the restoration path in the forward direction of the connection, and establishing a bridge in the reverse direction of the connection.

Preferably, the network element searches the next network element through a restoration mapping table.

The restoration mapping table can be calculated by the network management system or planning system of the optical network or calculated by the individual network elements through signaling; and can be configured per network element by the network maintainer or configured through signaling process upon assigning the discriminator values for the restoration path.

Preferably, the associated signaling channels are unused bytes of the channel-level overhead in the physical frame structure of the optical network.

Preferably, the associated signaling channels are unused overhead of the server layer in the physical frame structure of the optical network, the discriminators transmitted by the associated signaling channels being unique within the ports of the network elements sending the physical frames.

Preferably, the associated signaling channels are unused overhead of the server layer in the physical frame structure of the optical network, a one-to-one correspondence relationship being established between the discriminators transmitted by the associated signaling channels and the channels of the restoration path.

Preferably, the associated signaling channels are HDLC (High-level Data Link Control) protocol signaling channels over multiple overhead bytes.

Preferably, bit compression coding is applied to the discriminators to save the bandwidth of the associated signaling channels.

Preferably, said step b) detects the operating status of the working path through server layer alarm monitoring, or detects the operating status of the working path through channel layer alarm monitoring.

Further, the server layer alarm includes at least one of the following alarms: loss of signaling, loss of frame, multiplex section alarm indication, multiplex section remote alarm indication, and multiplex section signal degrade alarm in an SDH/SONET, loss of signal and remote alarm indication in an OTN; the channel layer alarm includes at least one of the following alarms: channel/virtual path alarm indication, channel error threshold-crossing, remote defect indication and remote error indication in an SDH/SONET, loss of signal, signal degrade and remote alarm indication in an OTN.

The method further includes, after the working path is repaired, a step of releasing the cross connection on the restoration path, which in turn includes steps of: 1) switching the service from the receiving side to the working path and transmitting an idle discriminator to an intermediate network element along the restoration path by the ingress network element; 2) searching a channel according to the original discriminator value of the restoration path by the intermediate network element after receiving the idle discriminator, and transmitting the idle discriminator to the channel; repeating step 2) until the egress network element receives the idle discriminator; 3) accomplishing cross connection switching in the forward direction of the bidirectional connection, implementing that the bidirectional service in the both directions is switched to the working path, and removing the reverse bridge of the bidirectional connection by the egress network element; 4) transferring the idle status overhead along the reverse direction of the restoration path by the egress network element, removing the cross connections in the both directions by the intermediate network element, and removing the bridge at the transmitting side by the ingress network element.

In the method according to an embodiment of the present invention, the problem in high-speed restoration of a MESH is solved and the restoration speed of the MESH is improved; and it need not to modify the existing devices and the software therein to a great extent, which facilitates a wide range of applications of the MESH restoration.

DETAILED DESCRIPTION OF THE PREFERRED EMBODIMENTS

Hereinafter the present invention will be described in detail with reference to accompanying drawings. The accompanying drawings are only used to illustrate the present invention but not limiting the scope thereof.

The term "MESH" used herein refers to a mesh optical network. The optical network includes Synchronous Digital Hierarchy (SDH), Synchronous Optical Network (SONET) and Optical Transport Network (OTN). "Bit-based protocol" refers to a protocol realized by repeatedly transferring a bit-encoded signal sequence through a dedicated communication channel, which has many advantages, for example, the implementation being simple, less software support being required and the transfer time delay being predictable. "Message-based protocol" refers to a protocol realized through a method of transporting message packets, for example, Internet Protocol (IP), which can be used with flexibility, but needs more supporting software, and for which the predictability of the transfer time delay is not good. "Link" refers to a fixed connection between two optical network elements generally based on an optical fiber or specific wavelength therein, wherein after being combined through various multiplexing technologies, multiple "channels" are transported through one link, and in the peer optical network element, the combined channels are demultiplexed into the original multiple channels. "Working path" refers to a network connection used for transporting a client signal among different sites, while "restoration path" refers to a network connection used for restoring the transport of the client signal when the working path fails and preventing the transport of the client signal from being interrupted due to a network failure, wherein to improve the utilization ratio of the network bandwidth, the restoration path can only reserve channel resources, which can be shared among multiple restoration paths. In general, both the working path and the restoration path are bidirectional in the optical network, and the establishing process is generally implemented from one end (i.e. "initiating end") to another end (i.e., "terminating end"), thus hereinafter the unidirectional connection identical to the establishing direction of the bidirectional connection is called the "forward direction", while the opposite unidirectional connection is called "reverse direction". "Resource reservation" refers to reserving channel resources and cross connections for the establishment of the network connection in advance so as to prevent the resources being occupied by the establishment of another connection. "Restoration path activation" refers to establishing a cross connection on a predetermined restoration path by utilizing the reserved resources, enabling this path to be used definitely for transporting services. "Discriminator" refers to a value assigned and negotiated for a specific restoration path through a specific link by the upstream and downstream network elements of the link, which is used for indicating, between the upstream and downstream network element, a channel through which the peer can activate the corresponding restoration path, and uniquely determining a restoration path when multiple restoration paths share this reserved channel. A discriminator is transported through the associated signaling channel, the coding uniqueness of a discriminator can be on a channel-level or a link-level, and a discriminator can be transported through a bit-based protocol or a message-based protocol.

Figure 1:
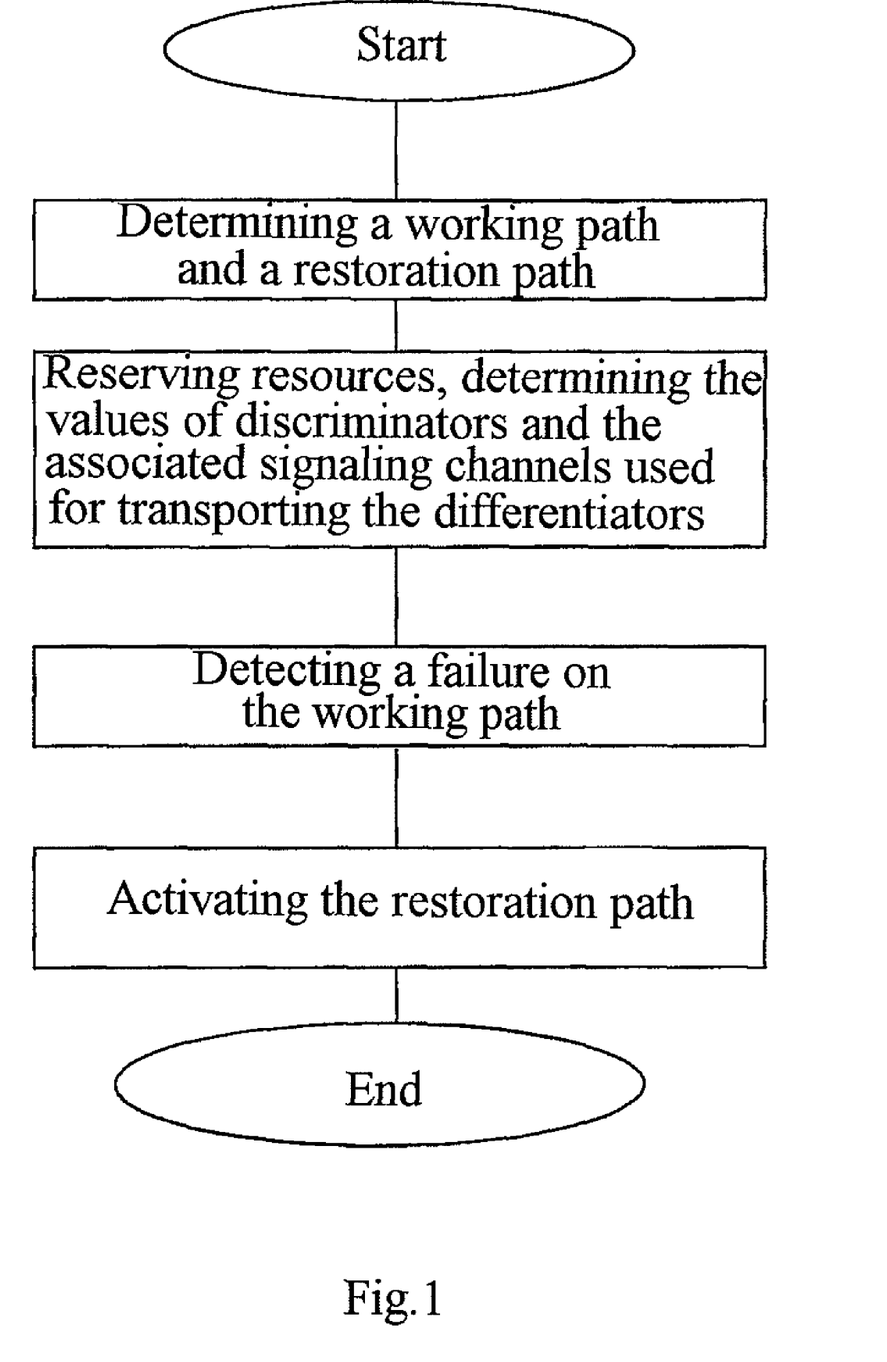
FIG. 1 is a schematic flow chart illustrating an embodiment of the method according to the present invention.

FIG. 1 is a flow chart illustrating an embodiment of the method for MESH service restoration according to the present invention. As shown in FIG. 1, in an embodiment of the present invention, the MESH restoration method of the present invention includes the steps of: a) reserving channel resources for a restoration path on the link through which the restoration path passes and assigning discriminators for individual channels, and determining the associated signaling channels for transporting the discriminators; b) detecting the operating status of the working path; c) activating the restoration path of the working path through a discriminator whose value corresponds to a restoration, transported through the associated signaling channel, when detecting that the working path fails. These steps will be described in detail hereinafter with reference to specific examples.

A discriminator in the present invention is first used to indicate whether a restoration of the individual channels of a restoration path needs to be performed; and second, used to determine which restoration path the channel resources should be applied to, when the channel resources on a restoration path are shared, i.e. one channel of a link is used for multiple restoration paths. So, the discriminator is related to the shared usage of a channel, and the number of the coded bits concerns with the maximal number of times that the restoration resources are permitted to be shared in a practical network. The greater the number of times is, the higher the utilization ratio of bandwidth is, and the larger a risk of restoration failure due to resource competition upon restoration is; in general, the number of the coded bits is selected from 3 to 10 to achieve a better effect. Considering no matter whether a failure occurs, the overhead for transporting the discriminators (which will be explained below) is transferred all along, in a normal status of the network, the discriminators may transfer a specific value (for example, 0) indicating the restoration channels are in an idle status. To reduce the occupation of the overhead bytes, the discriminators may be coded through bit compression coding, each occupying 2-4 bits, and accordingly, each overhead byte can transfer multiple discriminators based on the bit field. The overhead occupation can be further compressed through multi-frame coding, e.g., 8-frame coding can compress the required number of the overhead bytes to ⅛, but the time for detecting the overhead will be accordingly prolonged by 8 times.

For example, for an STM-64 link, considering the extreme case, all the 64 channels are used for restoration. If 4 bits are needed to transport one channel, the number of the overhead bytes required for transporting the discriminators is 64*4/8=32. If adopting 8-frame coding, wherein, 7 bytes are used for transporting the discriminators and 1 byte is used for transporting the check code of the other 7 bytes, the required number of the overhead bytes is 32/7, i.e. 5 bytes are enough.

In addition to the above-mentioned discriminator codes applied to a specific restoration path, a discriminator may also include a code indicating a normal status, i.e. a code indicating that the restoration path needs not to be activated, for example, 0, in which case the discriminator may be referred to as an idle discriminator. That is to say, when a network element receives a code 0 that indicates a normal status and was not just changed from a non-zero code, no operation needs to be performed.

Figure 2:
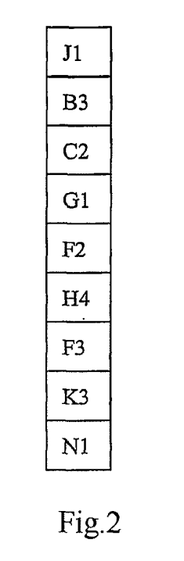
FIG. 2 is schematic diagram illustrating the channel overhead of VC-3/VC-4/VC-4-Xc in an SDH.

There are many methods for transporting the discriminators:

1. Transporting through channel-level overhead, such as unused bytes in the high-order channel overhead in SDH, such that the corresponding ports and channels can be obtained while the values of the discriminators are being monitored. FIG. 2 is a schematic diagram illustrating the channel overhead of VC-3/VC-4/VC-4-Xc in a SDH. As shown in FIG. 2, the channel overhead of Virtual Container-3 (VC-3)/Virtual Container-4 (VC-4)/standard concatenation of Virtual Container-4 (VC-4-Xc) occupies 1 column of totally 9 bytes, wherein, the 5-8th bits of K3 byte are reserved bits in the standard, and these 4 bits can be used for transporting the discriminators. In addition, N1 byte (network operator byte) can also be used for transporting the discriminators. It needs to arrange the values of the discriminators in the overhead bytes of the corresponding channel on the corresponding link at the network element transmitting the discriminators, and the downstream node detects the corresponding values of the overhead to obtain the discriminators and obtain the port (link) and channel identifications from the positions of the overhead.

Figure 3:
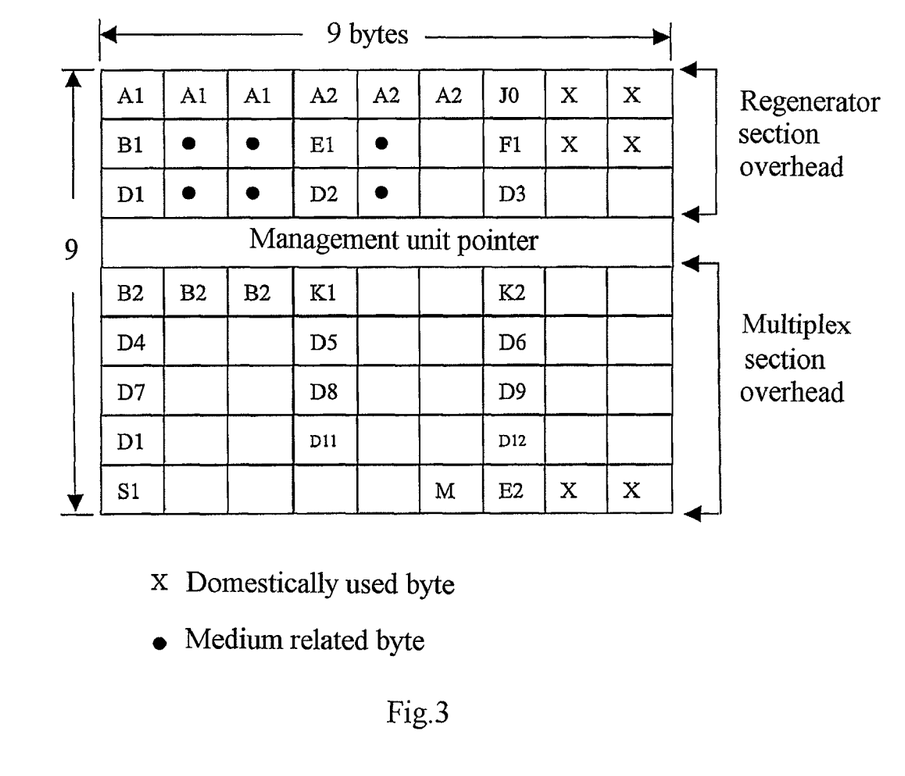
FIG. 3 is a schematic diagram illustrating the overhead in a frame format of an SDH STM-1 line.

2. Transporting through unused overhead of the server layer, such as unused overhead in an SDH multiplex section. FIG. 3 shows the overhead in the frame format of the SDH STM-1 line, wherein, the 5 rows by 9 columns in the lower part of the figure represent the overhead of the multiplex section layer, where the "blanks" represent unused overhead. For an STM-64 link, all the overhead shown in FIG. 3 are repeated 64 times in succession, i.e. the position of each byte in the figure represents 64 bytes; when being transported in a practical line, these 64 bytes are transmitted in sequence, and then the 64 repetitions of the next overhead byte are transmitted. The position of the overhead is generally expressed in (row, column, count of repetitions), for example, (6, 1, 1) means the first repetition of the byte of row 6, column 1, which corresponds to D4 byte. In the multiplex section overhead, except that the corresponding 64 repetitions of B2 byte are used, and only the position corresponding to the third repetition of the 64 repetitions in M1 overhead byte, i.e. overhead position (9, 6, 3) is used, for the remaining overhead, only the position of the first repetition is occupied, and the other overhead positions are not defined. For the lines of STM-64, there are about 5000 undefined overhead bytes. A one-to-one correspondence relationship between the positions of the overhead in the server layer overhead and all the channels born by the server layer is created in advance, thus the port and channel identifications can be obtained directly from the positions of the overhead in the frame structure. For example, multiplex section overhead (6, 1, 1) of a STM-64 link corresponds to the first channel, overhead (6, 1, 2) corresponds to the second channel, and so on. For such a correspondence relationship, it is required that the correspondence relationships for the two sides of the line must be consistent with each other; and to be simplified, those for all the optical network elements can be configured to be the same. The transmitting network element needs to employ the corresponding channel numbers of the discriminators to obtain the positions of the overhead according to the above-mentioned correspondence relationship, and set the corresponding overhead values of the corresponding ports as the discriminator values, while the receiving network element monitors the overhead of the server layer and obtains the channel numbers from the overhead positions according to the above-mentioned relationship.

3) Transporting through the overhead of the server layer without adopting any fixed binding relationship. Here the codes of a discriminator should be unique within the port of the link transporting the discriminator.

When the overhead bytes are used as dedicated signaling channels to transport the discriminators as mentioned above, the overhead bytes are repeatedly transmitted with a speed of 8000 frames/second in an SDH/SONET, and transport of the discriminators is implemented through setting overhead bytes, thus the discriminators are repeatedly transmitted all along, and the peer network element monitors the change in the overhead values through hardware and reports the change to the control processor by means of interrupt for corresponding processing.

Figure 4:
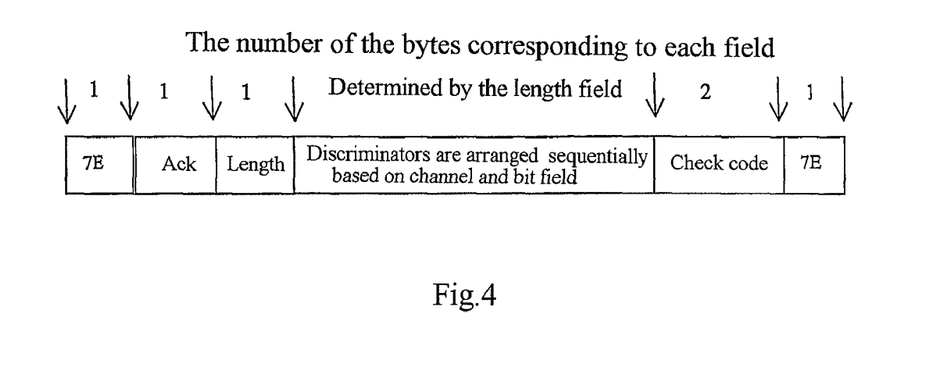
FIG. 4 is a coding format for transporting the discriminators of the individual channels through an HDLC link on the STM-64 port in an SDH network.

4. Transporting through a Data Communication Network (DCN) composed of dedicated signaling channels (referring to ITU-T recommendation G.7712), for example, operating HDLC (High-level Data Link Control) protocol to transport the discriminators employing D4-D12 or other unused bytes in the overhead of the multiplex section of an SDH. To support the real-time nature of the discriminator transport, it is suggested that the signaling channels should be dedicated ones. If the optical network elements cannot support a lot of undefined overhead processing because of the limitation in hardware, transporting the discriminators through the HDLC protocol can save overhead bytes. The HDLC protocol belongs to link layer protocols; here only the coding of this protocol is used, rather than the other procedures, so the processing overhead is very little, and the discriminators can be transported rapidly. FIG. 4 shows a coding format for transporting the channel discriminators through an HDLC link in a STM-64 port, wherein the hexadecimal value 7E is used for identifying the start and the end of the HDLC frame;

the length field is used for indicating the byte length of the following discriminator sequence, and if the discriminators adopt 4-bit codes, and 64 channels occupy 32 bytes, the length field is 32; the check code is used for the receiving end to check the integrality of the frame structure. The transmitting network element repeatedly transmits the discriminator frame in succession, and when confirming the frame is correct, the receiving network element transmits a acknowledgement frame to the transmitting network element, and on receiving the acknowledgement frame, the transmitting element network may stop transmitting the discriminator frame and for the next time the discriminator value is changed, start the transmission again. The acknowledgement frame can be transmitted in combination with the discriminator frame; if it is transmitted alone, the length field is 0, indicating there is no content of the discriminators contained thereafter.

The discriminators can be transported through any one of the above-mentioned methods, wherein the corresponding transmitting and receiving methods have been described above in detail, and hereinafter, referred to as transporting the discriminators through "associated signaling channels". It needs to be explained that all the associated signaling channels described above are bidirectional, through which the network elements at the both ends of the link can transmit discriminators to the peer.

The method according to an embodiment of the present invention will be described in detail hereinafter. As described above, in the present invention, a resource reservation is performed first for the working path and the restoration path of the working path. For this purpose, it needs to determine the working path and the restoration path first. The working path and the restoration path can be obtained through a centralized calculation (referring to Wayne D. Grover, "Mesh-based survivable networks-Options and Strategies for Optical, MPLS, SONET, and ATM Networking", p 311-313, PRENTICE HALL PTR, ISBN 0-13-494576-X) or obtained through a distributed protocol (referring to IETF draft, RSVP-TE Extensions in support of End-to-End GMPLS-based Recovery). All the methods in which the working path and the restoration path can be obtained can be used to implement the present invention.

Then, a resource reservation is performed for the working path and the restoration path of the working path on the link through which passes, and discriminators are assigned for the restoration path.

Figure 5:
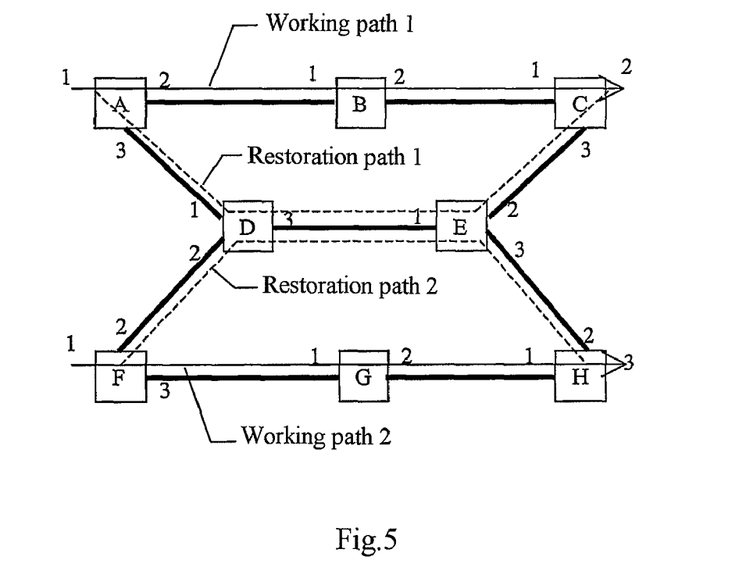
FIG. 5 is a schematic diagram illustrating an example of a MESH.

FIG. 5 shows an example of a MESH, wherein the MESH includes network element A, B, C, D, E, F, G and H, and the connection relationship is denoted by the bold solid lines in the figure, working path 1 passes through network elements A, B and C, and the restoration path thereof passes through A, D, E and C; working path 2 passes through network elements F, G and H, and the restoration path thereof passes through F, D, E and H. All the links and the working paths and the restoration paths of the network connections in this figure are bidirectional.

In the stage of restoration path resource reservation, the relevant network elements need to create a restoration mapping table for all the restoration paths, which can be configured through network management or implemented through a signaling protocol. Hereinafter a signaling protocol is taken as an example to explain the process of creating the restoration mapping table, and the centralized network management configuration method can be regarded as a centralized implementation of this process, which will not be explained separately.

The signaling process in the reservation stage for restoration path 1 includes the following steps.

1. Ingress network element A receives a message for initiating a resource reservation request for restoration path 1 from the network management system, wherein, the information of the message includes:

a) ingress network element (A), port (1) and channel (1, optional)

b) egress network element (C), port (2) and channel (1, optional)

c) service granularity (VC-4)

d) source routing, which is given in a form of "network element-egress port-channel": A-3-1, D-3-1 and E-2-1.

2. Ingress network element A reserves the corresponding resources for restoration path 1, i.e. channel 1 of port 3, and transmits the request message to the next hop D appointed by the source routing;

3. On receiving the request message, network element D reserves resources according to the information presented by the source routing, and transmits the request to the next hop E;

4. On receiving the request message, network element E reserves resources according to the information presented by the source routing, and transmits the request to the next hop C;

5. On receiving the request message, and being found to be the egress node of the restoration path, network element C assigns channel 1 and discriminator value 1 on port 3 for the restoration path, creates a restoration mapping table as shown by Table 2, and transmits the assigned channels of the restoration path and the discriminator values through a response message to network element E in the direction opposite to that of the request message;

6. On receiving the response message, network element E obtains the channel and the discriminator value assigned by network element C, assigns channel 1 and discriminator value 1 on port 1 for the restoration path, creates an item of restoration mapping table as shown by the first item of Table 6, and transmits the assigned channels of the restoration path and the discriminator values through a response message to network element D in the direction opposite to that of the request message;

7. On receiving the response message, network element D obtains the channel and the discriminator value assigned by network element E, assigns channel 1 and discriminator value 1 on port 1 for the restoration path, creates an item of restoration mapping table as shown by the first item of Table 5, and transmits the assigned channels of the restoration path and the discriminator values through a response message to network element A in the direction opposite to that of the request message;

8. On receiving the response message, network element A obtains the channels and the discriminator values assigned by network element D, and creates a restoration mapping table as shown by Table 1, and the signaling processing in the reservation stage for the restoration path is accomplished.

TABLE 1

The restoration mapping table of network element A

| Ingress Port | Ingress Channel | Ingress Discriminator Value | Egress Port | Egress Channel | Egress Discriminator Value | Remark |
|---|---|---|---|---|---|---|
| 1 | 1 | — | 3 | 1 | 1 | Restoration path 1 |

TABLE 2

The restoration mapping table of network element C

| Ingress Port | Ingress Channel | Ingress Discriminator Value | Egress Port | Egress Channel | Egress Discriminator Value | Remark |
|---|---|---|---|---|---|---|
| 3 | 1 | 1 | 2 | 1 | — | Restoration path 1 |

TABLE 3

The restoration mapping table of network element F

| Ingress Port | Ingress Channel | Ingress Discriminator Value | Egress Port | Egress Channel | Egress Discriminator Value | Remark |
|---|---|---|---|---|---|---|
| 1 | 1 | — | 2 | 1 | 1 | Restoration path 2 |

TABLE 4

The restoration mapping table of network element H

| Ingress Port | Ingress Channel | Ingress Discriminator Value | Egress Port | Egress Channel | Egress Discriminator Value | Remark |
|---|---|---|---|---|---|---|
| 2 | 1 | 1 | 3 | 1 | — | Restoration path 2 |

TABLE 5

The restoration mapping table of network element D

| Ingress Port | Ingress Channel | Ingress Discriminator Value | Egress Port | Egress Channel | Egress Discriminator Value | Remark |
|---|---|---|---|---|---|---|
| 1 | 1 | 1 | 3 | 1 | 1 | Restoration path 1 |
| 2 | 1 | 1 | 3 | 1 | 2 | Restoration path 2 |

TABLE 6

The restoration mapping table of network element E

| Ingress Port | Ingress Channel | Ingress Discriminator Value | Egress Port | Egress Channel | Egress Discriminator Value | Remark |
|---|---|---|---|---|---|---|
| 1 | 1 | 1 | 2 | 1 | 1 | Restoration path 1 |
| 1 | 1 | 2 | 3 | 1 | 1 | Restoration path 2 |

The explanations of the contents in the restoration mapping tables are related to the roles of the network elements on the restoration path, which can be classified into ingress network element, intermediate network element and egress network element:

1. the ingress network element of the restoration path, wherein the ingress port and the ingress channel (optional) refer to the ingress of the network connection, the ingress discriminators are not used, the egress port and the egress channel provide the egress of the restoration channel, and the egress discriminator presents the discriminator value that needs to be transported through the associated signaling channel;

2. the intermediate network element of the restoration path, wherein the ingress port, the ingress channel and the ingress discriminator value are received through the associated signaling channel, the egress port and the egress channel provide the egress of the restoration path, and the egress discriminator presents the discriminator value that needs to be transported through a dedicated signaling channel;

3. the egress network element of the restoration path, wherein the ingress port, the ingress channel and the ingress discriminator value are received through the associated signaling channel, the egress port and the egress channel provide the egress of the restoration path, and the egress discriminator is not used.

It needs to be noted that the roles of the network elements are different in terms of a specific restoration path; for different restoration paths, a specific network element may play different roles. Moreover, in the direction from the ingress node to the egress node, the egress discriminator value of the upstream network element must be equal to the ingress discriminator value of the peer network element (the downstream network element).

Hereinafter the restoration mapping table created at the shared node when the channel resources on the restoration path are shared will be described. In the MESH shown in FIG. 5, considering that there is no correlation between working path 1 and working path 2 in terms of failure, working path 1 and working path 2 share the resources on link D-E. After creating a restoration mapping table for the restoration path passing through network elements A, D, E and C and creating a restoration mapping table for the restoration path passing through network elements F, D, E and H, the restoration mapping tables shown by Table 3 and Table 4 are formed at network elements F and network element H, and the restoration mapping tables shown by Table 5 and Table 6 are formed at network element D and network element E, which assign different discriminators for different restoration paths, i.e. for the shared restoration path resources, it needs to assign different discriminator values for different restoration paths.

It should be noted that the above-mentioned method for creating restoration mapping tables is only schematic, and applicable to the case of binding discriminators with channels. Those skilled in the art should be appreciated that, when such binding is not implemented, the process of creating the restoration mapping tables of the network elements needs to be modified accordingly: in the restoration mapping table of the intermediate network element, the ingress restoration channel, egress restoration port, channel and discriminator are obtained from the ingress restoration port and ingress discriminator value, and in the restoration mapping table of the egress network element, the (ingress) restoration channel, and (egress) port and channel of the working path are obtained from the (ingress) restoration port and discriminator. In addition, the remark part is not necessary.

In addition, the calculation of the restoration mapping tables can be separated from the configuration implemented at the network elements, wherein the calculation can be a centralized calculation performed by the network management system or planning system, or a distributed calculation performed by means of signaling; while the downloading of the items of the restoration mapping tables can be configured station-by-station or performed through signaling. There may be a case of centralized calculation with the configurations downloaded through signaling.

In the stage of resource reservation, the associated signaling channels for transporting the discriminators also need to be appointed; the establishment of the associated signaling channels is described in detail above, and the details thereof will not be given here.

Subsequently, the working path is activated. The activation of the working path can be implemented through the signaling protocol of the control plane, for example, the GMPLS extended RSVP-TE protocol. The method for activating the working path is well known (referring to J. P. Lang, Y. Rekhter, D. Papadimitriou (Editor), "RSVP-TE Extensions in support of End-to-End GMPLS-based Recovery", Internet Draft, Work in progress, draft-ietf-ccamp-gmpls-recovery-e2e-signaling-01.txt, May 2004.), thus herein the details thereof will not be given.

After activating the working path, in normal conditions (i.e. when the working path normally operates), the dedicated signaling channel transmits an idle discriminator, such as an all-zero code. The network elements (including all the network elements acting as an initiating end or terminating end of the restoration path) determine whether the working path is interrupted through alarm monitoring. If the network elements find an alarm and determine the working path is interrupted, the restoration path will be activated. When implementing alarm monitoring, it needs to determine the site and type of an alarm to be monitored by determining the working path is to be restored in terms of segment or of path.

In the case of section restoration, it needs to detect the server layer alarm of the working path on all the segments (i.e. links) of the working path. For an SDH/SONET, it needs to monitor the alarm of the multiplex section layer, including Loss of Signaling (LOS), Loss of Frame (LOF), Multiplex Section Alarm Indication Signal (MS-AIS), Multiplex Section Remote Defect Indication (MS-RDI), Multiplex Section Signal Degrade (B2SD) and so on; for an OTN, it needs to detect the alarm such as Signal Fail (SF) and Remote Defect Indication (BRDI). If one of these alarms occurs, it needs to implement a local restoration on the link where the alarm occurs, i.e. select another path between the upstream node and the downstream node of the link to bypass the failed link. Multiple channels for the working path can be restored from the interruption due to a link failure through multiple restoration paths, which need to be activated by driving through the steps described below.

In the case of path restoration, it needs to detect the channel alarm of the ingress network element and the egress network element of the whole working path. For an SDH/SONET, such an alarm refers to Alarm Indication of Channel/Virtual Path (AIS), Channel Error threshold-crossing (B3SD), Remote Defect Indication (RDI) and Remote Error Indication (REI); while for an OTN the alarm includes Signal Fail (SF), Signal Degrade (SD) and Remote Alarm Indication (RAI). The occurrence of these alarms indicates the corresponding working path is interrupted, and it needs to activate the associated restoration path by driving through the steps described below.

Figure 6:
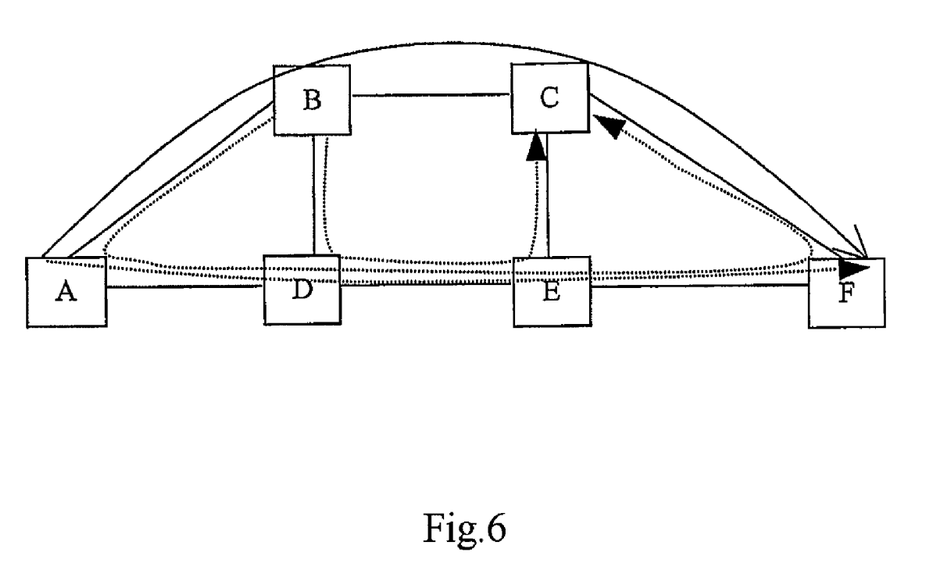
FIG. 6 is a schematic diagram illustrating the two methods for network restoration.

Here the segment restoration and the path restoration are two methods for network restoration. FIG. 6 is a schematic diagram used for explaining the two methods for network restoration. As shown in FIG. 6, the working path of service connection A-F passes through A-B-C-F. If the path restoration is employed, the restoration path passes through path A-D-E-F without intersecting with the nodes (or the links) of the working path; if the segment restoration is employed, the restoration is not performed in view of the end-to-end path, but in view of the link through which the path passes. For example, the working channels on link B-C can be restored through multiple restoration paths: paths B-D-E-C and B-A-D-E-C.

It should be noted that although it is herein differentiated between segment restoration and path restoration to determine the operating status of the working path, the method according to the present invention is applicable to the both. "Working path of the restoration path" refers to a path for which a restoration can be implemented through the restoration path. That is to say, there is no difference between the restoration paths of a segment and a path.

Hereinafter, the process of activating a restoration path will be described in detail. In an embodiment of the present invention, the process of activating a restoration path includes the steps of: 1) searching the next network element of the restoration path by the ingress network element of the restoration path, transmitting a discriminator whose value corresponds to a restoration to the next network element through the associated signaling channel, and then establishing a cross connection; 2) searching the still next network element according to the received value of the discriminator if the next network element is an intermediate network element of the restoration path, transmitting the discriminator whose value corresponds to a restoration to the still next network element, and then establishing a cross connection, until the egress network element receives the discriminator whose value corresponds to a restoration, and going to step 3); or going to step 3) directly if the next network element is the egress network element; 3) establishing a cross connection by the egress network element. Finally, the egress network element preferably transmits an acknowledge discriminator to the network elements one-by-one along the path opposite to the restoration path. The value of the acknowledge discriminator is the same as that of the discriminator for activating the restoration path in the forward direction.

During the above-mentioned process, all the network elements first transmit the discriminators, and then establish cross connections. Alternatively, a discriminator whose value indicates the activation needs to be performed by the next network element can be transmitted after the cross-connection has been established.

When establishing a cross connection, the ingress network element implements a bridge (the signals are simultaneously transmitted to the working path and the restoration path) in the forward direction of the connection (consistent with the direction in the activation), and switches the cross to the restoration path in the reverse direction of the connection; an intermediate network element establishes a bidirectional cross connection; and the process for the egress network element is exactly reverse to that for the ingress network element, it switches the cross to the restoration path in the forward direction of the connection and implements a bridge in the reverse direction.

Hereinafter the steps for activating the restoration path will be described in detail taking example for the activation of restoration path 1 shown in FIG. 5.

1. Network element A finds working path 1 is interrupted through alarm monitoring, and starts the restoration process;

2. Network element A searches the restoration mapping table of network element A through the ingress port and channel of working path 1 and obtains restoration port 3, channel 1 and the value 1 of the discriminator; starts up the associated signaling channels of port 3, channel 1 to transmits the discriminator (whose value is 1) to peer network element D; since the network connection is bidirectional, it needs to establish a cross connection between ingress port 1, channel 1 and restoration port 1, channel 1 in the forward direction (consistent with the direction in the activation) to implement a bridging of the input signals on the working path and the restoration path; while in the reverse direction, it needs to remove the cross connection of the working path and establish a cross from restoration port 3, channel 1 to ingress port 1, channel 1;

3. Intermediate network element D detects the value of the discriminator of network element A transported by the associated signaling channel and finds the discriminator is changed from idle status 0 to 1, then searches the restoration mapping table through the discriminator (referring to Table 5) and obtains the restoration port 3, channel 1 and the value 1 of the egress discriminator, and sets the contents of the restoration overhead of the port according to the value of the discriminator; implements a bidirectional cross connection between ingress port 1, channel 1 and egress port 3, channel 1; and as an initiating network element of the next segment of the restoration path, it transmits a discriminator whose value indicates the restoration path needs to be activated to peer network element E through the associated signaling channel;

4. The subsequent intermediate network element E repeats step 3 until the egress network element;

5. Egress network element C detects the value of the discriminator transported by the associated signaling channel and finds the discriminator is changed from idle status 0 to 1, then searches the restoration mapping table (referring to Table 2) through ingress port 3, channel 1 and discriminator value 1 and obtains the egress port 2 and channel 1, and implements a cross-switching at the egress of the restoration path according to the information, accomplishing the service switching from the working path to the restoration path: in the forward direction, it needs to remove the cross connection of the working path and establish a cross from ingress port 3, channel 1 to egress port 2, channel 1; while in the reverse direction, it needs to add a cross from egress port 2, channel 1 to ingress port 3, channel 1 to implement a bridge;

6. Egress network element C transmits the value of the discriminator back to the network elements one-by-one through to ingress network element A in the direction opposite to the restoration path, and ingress network element A confirms that the restoration path is accomplished.

The restoration of the service from the working path to the restoration path is thus accomplished trough activation of the restoration path implemented by the above-mentioned steps. These steps are implemented only according to the information in the memory, which can guarantee the restoration path is established with a high-speed and the restoration speed similar to that for the ASP protocol of shared multiplex section ring can be achieved.

If an error occurs in any step of the process of activating the restoration path, it needs to transmit an idle discriminator value of 0 to the upstream and downstream of the restoration path. The network elements receive the discriminator value and find the value of the discriminator is changed from non-zero to zero, it needs to search an established cross connection to be removed according to the original discriminator value, port and channel information; while the downstream node continues to transmit an idle discriminator value of 0 downstream along the restoration path through to the egress network element. If a corresponding cross connection exists, it also needs to remove the cross connection according to the above method. After removing the cross connections, the individual network elements also need to transmit an idle discriminator value of 0 to the upstream network elements.

After the working path is restored from a failure, the network connection needs to be switched from the restoration path to the original working path, and the cross connection on the restoration path will be released, and these resources can be used for restoring other networks from a failure.

The steps for releasing the cross connection on the restoration path include: 1) the ingress network element switching the service from the receiving side to the working path, and transmitting an idle discriminator to an intermediate network element along the restoration path; 2) on receiving the idle discriminator, the intermediate network element searching a channel according to the original discriminator value of the restoration path, and transmits the idle discriminator to the channel; repeating step 2) until the egress network element receives the idle discriminator; 3) the egress network element accomplishing cross connection switching in the forward direction of the bidirectional connection, implementing that both directions of the bidirectional service are switched to the working path, and removing the reverse bridge of the bidirectional connection; 4) the egress network element transferring the idle status overhead in the reverse direction of the restoration path, the intermediate network element removing the cross connections in both directions, and the ingress network element removing the bridge at the transmitting side.

The steps of the restoration process will be explained taking example for working path 1.

1. Working path 1 is restored from a failure, and ingress network element A detects an alarm disappear event, and waits for the timeout of waiting-for-restoration timer;

2. If ingress network element A does not detect any alarm again during the waiting-for-restoration time, the restoration process (step 3) will start; otherwise the process will end, and the ingress network element still waits until no alarm is detected;

3. Ingress network element A first switches the reverse direction (in which the network element implements receiving) of the bidirectional connection to the working path, and transmits an idle discriminator to network element D through port 1, channel 1 along the restoration path;

4. On receiving the idle discriminator value, network element D finds the discriminator value of port 1, channel 1 is changed from 1 to idle status 0, obtains egress port 3, channel 1 through searching the restoration mapping table according to the original discriminator value 1 of the restoration path and sets the discriminator of the channel as an idle status;

5. Network element E repeats the actions of network element D, sets the discriminator of egress port 2, channel 1 as an idle status;

6. On receiving the idle status discriminator, egress network element C accomplishes cross connection switching in the forward direction of the bidirectional connection, implementing that both directions of the bidirectional services are switched to the working path, and removes the reverse bridge of the bidirectional connection;

7. Egress network element C transfers the idle status overhead in the opposite direction of the restoration path, network element E and network element D remove the cross connections of both directions, and network element A removes the bridge in the forward direction of the bidirectional connection.

To improve restoration speed, if multiple restoration paths pass through the same path, during the activation of these multiple restoration paths, it needs to batch perform the discriminator transfer process and the establishment of the cross connection. If the associated signaling channels used in the discriminator transfer process during the activation are based on the HDLC protocol or the overhead byte multi-frame coding, transmission on all the restoration paths with the same path should be batch performed as far as possible to improve transport efficiency; for the other associated signaling channels based on the overhead bytes, the receiving side needs to wait for a time period of several frames, and then batch performs configuration of the cross connection(s) and transmission of the discriminator(s), respectively, thus the efficiency is improved.

The restoration time of the network connection refers to the time from the point that the working path fails to the point that the network connection is restored by the activation of the restoration path, i.e. the interruption time of the network connection. The length of the restoration time is related to the following factors:

1. alarm monitoring time, i.e. the time from the point that the network failure occurs (such as the an optical fiber is cut off) to the point that the alarm monitor finds the failure;

2. alarm notification time: if the alarm occurs in the middle of the network connection, and the restoration operation needs to be performed at the ingress node of the connection, it maybe required that a Notification message should be transferred through a DCN, for example, the GMPLS extended REVP-TE supports transmitting a failure notification to the ingress node and egress node through a Notification message;

3. restoration signaling transfer time, including transmitting time and line propagation delay: for GMPLS extended REVP-TE signaling protocol, the restoration signaling is transferred through a Path message, and in general, each message contains about 500 bytes; the Path message is instantiated for each channel, wherein the restoration signaling needs only one byte or less;

4. protocol processing time, from receiving the restoration signaling, accomplishing decoding, updating state machine to forwarding restoration signaling: this process needs communication among tasks and other works, and needs to occupy the time of the processor; the corresponding processing of the GMPLS extended RSVP-TE signaling protocol is relatively complicated, while the restoration signaling process described in an embodiment of the present invention is very simple;

5. cross connection configuration time: the network elements need time to configure cross connection after receiving the restoration signaling, and the adjustment operation of the cross connection needs time; in an embodiment of the present invention, a method of forwarding restoration signaling first and then starting up cross connection is used, such that the cross connection operation of each network element on the restoration path can be parallelized.

In an embodiment of the present invention, the processing time can be saved and the restoration process can be accelerated in terms of Factor 3 and Factor 4. If the GMPLS extended RSVP-TE is over a 576 kbits/s DCN composed of overhead bytes D4-12 of an SDH, the time required for transporting the Path messages of the restoration signaling on 64 VC-4 channels of STM-64 is 500*8*64/576000, i.e. about 440 ms. In an embodiment of the present invention in which a restoration signaling transmitting method is used, if the overhead bytes are employed to transfer signaling, the signaling transfer of all the 64 channels will be completed in 125 microseconds theoretically; even if taking into account the detection processing of the network elements, the signaling transfer should be completed in about 1 millisecond; if the above-mentioned DCN is used as a dedicated channel, considering the overhead of HDLC packet header, there are 60 bytes of restoration signaling for the 64 channels, then the transmitting time is 60*8/576000, i.e. about 1 millisecond. In terms of Factor 4, the processing overhead of the GMPLS extended RSVP-TE protocol is considerably complicated, and the protocol processing time is several milliseconds, while the protocol processing described in an embodiment of the present invention only needs a simple table-lookup process, so the processing time can be neglected, and in contrast, serial processing per channel for the restoration signaling of RSVP-TE will further increase the total overhead. In addition, since the IP DCN used by the GMPLS is of a sharing nature, various Notification messages and link state advertisement by routing protocols that need to be implemented when a failure occurs increases the burdens on the DCN, such that the time of the restoration process based on GMPLS signaling will greatly fluctuate; while transferring the restoration signaling through the dedicated restoration signaling channel as described in an embodiment of the present invention can obviate this problem, realizing stability and predictability of the restoration time.

Although the present invention has been described in terms of the preferred embodiments, those skilled in the art should understand these embodiments are not intended to limit the protection scope of the invention, and various changes and modifications can be made within the scope of the present invention which is only defined by the appended claims and the equivalents thereof.

The invention claimed is:

1. A method for implementing mesh optical network service restoration, comprising:
   a) reserving channel resources for a restoration path on the link or links through which the restoration path passes and assigning discriminators for individual channels, and determining associated signaling channels for transporting the discriminators;
   b) activating the restoration path of a working path according to a discriminator whose value corresponds to a restoration, transported by the associated signaling channel, when detecting that the working path fails,
   wherein the restoration path is activated according to the following steps of:
   1) searching a next network element of the restoration path by an ingress network element of the restoration path, transmitting a discriminator whose value corresponds to a restoration to the next network element through the associated signaling channel, and then establishing a cross connection;
   2) searching a still next network element according to the value of the discriminator corresponding to a restoration if the next network element is an intermediate network element, transmitting the discriminator whose value corresponds to a restoration to the still next network element, and then establishing a cross connection, until an egress network element of the restoration path receives the discriminator whose value corresponds to a restoration, and going to step 3), or going to step 3) directly if the next network element is the egress network element;
   3) establishing a cross connection by the egress network element; and
   4) transmitting information confirming the restoration path is accomplished, in a direction opposite to the restoration path, by the egress network element, the information referring to the value of a discriminator corresponding to a restoration.

2. The method according to claim 1, wherein said establishing a cross connection refers to:
   the ingress network element implementing a bridge in a forward direction of the cross connection for simultaneously transmitting signals to the working path and the restoration path in the forward direction, the forward direction of the cross connection being consistent with a direction of an activation, and switching the cross connection to the restoration path in a reverse direction of the cross connection for transmitting signals to the restoration path in the reverse direction;
   an intermediate network element establishing a bidirectional cross connection in which signals are transmitted both in the forward direction and the reverse direction thereof;
   the egress network element switching the cross connection to the restoration path in the forward direction of the cross connection for transmitting signals to the restoration path in the forward direction, and establishing a bridge in the reverse direction of the cross connection for simultaneously transmitting the signals to the working path and the restoration path in the reverse direction.

3. The method according to claim 1, wherein a network element searches the next network element through a restoration mapping table.

4. The method according to claim 3, wherein the restoration mapping table is calculated by a network management system or planning system of an optical network or calculated by the individual network elements through signaling; and is configured per network element by a network maintainer or configured through signaling process upon assigning the value of the discriminator for the restoration path.

5. The method according to claim 1, wherein the associated signaling channels are unused bytes of channel-level overhead in a physical frame structure of an optical network.

6. The method according to claim 1, wherein the associated signaling channels are unused overhead of a server layer in a physical frame structure of an optical network, the discriminators transmitted by the associated signaling channels being unique within ports of network elements sending physical frames.

7. The method according to claim 1, wherein the associated signaling channels are unused overhead of a server layer in a physical frame structure of an optical network, a one-to-one correspondence relationship being established between the discriminators transmitted by the associated signaling channels and the channels of the restoration path.

8. The method according to claim 1, wherein the associated signaling channels are HDLC (High-level Data Link Control) protocol signaling channels over multiple overhead bytes.

9. The method according to claim 1, wherein bit compression coding is applied to the discriminators.

10. The method according to claim 1, wherein operating status of the working path is detected through server layer alarm monitoring or channel layer alarm monitoring.

11. The method according to claim 10, wherein the server layer alarm includes at least one of the following alarms: loss of signaling, loss of frame, multiplex section alarm indication, multiplex section remote alarm indication, and multiplex section signal degrade alarm in an SDH/SONET, loss of signal and remote alarm indication in an OTN; the channel layer alarm includes at least one of the following alarms: channel/virtual path alarm indication, channel error threshold-crossing, remote defect indication and remote error indication in an SDH/SONET, loss of signal, signal degrade and remote alarm indication in an OTN.

12. The method according to claim 1, further comprising, after the working path is repaired, a step of releasing the cross connection on the restoration path, which in turn includes steps of:
   1) switching a service from a receiving side to the working path and transmitting an idle discriminator to an intermediate network element along the restoration path by the ingress network element;
   2) searching a channel according to an original discriminator value of the restoration path by the intermediate network element after receiving the idle discriminator, and transmitting an idle discriminator to the channel; repeating step 2) until the egress network element receives the idle discriminator;
   3) accomplishing cross connection switching in a forward direction of a bidirectional cross connection for switching a bidirectional service to the working path in both the forward direction and a reverse direction of the bidirectional cross connection, and removing a reverse bridge of the egress network element in the reverse direction of the bidirectional cross connection;

4) transferring an idle status overhead along the reverse direction of the restoration path by the egress network element, removing the cross connections of the intermediate network element in both the forward direction and the reverse direction of the bidirectional cross connection, and removing a bridge at a transmitting side of the ingress network element.

13. A method for implementing mesh optical network service restoration, comprising:

a) reserving channel resources for a restoration path on a link or links through which the restoration path passes and assigning discriminators for individual channels, and determining associated signaling channels for transporting the discriminators;

b) activating the restoration path of a working path according to a discriminator whose value corresponds to a restoration, transported by the associated signaling channel, when detecting that the working path fails, wherein the restoration path is activated according to the following steps of:

1) searching a next network element of the restoration path by an ingress network element of the restoration path, establishing a cross connection, and then transmitting a discriminators whose value corresponds to a restoration to the next network element through the associated signaling channel;

2) searching a still next network element according to a value of the discriminator corresponding to a restoration if the next network element is an intermediate network element of the restoration path, establishing a cross connection, and then transmitting the discriminator whose value corresponds to a restoration to the still next network element, until an egress network element of the restoration path receives the discriminator whose value corresponds to a restoration, and going to step 3), or going to step 3) directly if the next network element is the egress network element;

3) establishing a cross connection by the egress network element; and 4) transmitting information confirming the restoration path is accomplished, in a direction opposite to the restoration path, by the egress network element, the information referring to the value of a discriminator corresponding to a restoration.

14. The method according to claim 13, wherein said establishing a cross connection refers to:

the ingress network element implementing a bridge in a forward direction of the cross connection for simultaneously transmitting signals to the working path and the restoration path in the forward direction, the forward direction of the cross connection being consistent with a direction of an activation, and switching the cross connection to the restoration path in a reverse direction of the cross connection for transmitting signals to the restoration path in the reverse direction;

an intermediate network element establishing a bidirectional cross connection in which signals are transmitted both in the forward direction and the reverse direction thereof;

the egress network element switching the cross connection to the restoration path in the forward direction of the cross connection for transmitting signals to the restoration path in the forward direction, and establishing a bridge in the reverse direction of the cross connection for simultaneously transmitting the signals to the working path and the restoration path in the reverse direction.

15. The method according to claim 13, wherein a network element searches the next network element through a restoration mapping table.

16. The method according to claim 15, wherein the restoration mapping table is calculated by a network management system or planning system of an optical network or calculated by the individual network elements through signaling; and is configured per network element by a network maintainer or configured through signaling process upon assigning the value of the discriminator for the restoration path.

17. The method according to claim 13, wherein the associated signaling channels are unused bytes of channel-level overhead in a physical frame structure of an optical network.

18. The method according to claim 13, wherein the associated signaling channels are unused overhead of a server layer in a physical frame structure of an optical network, the discriminators transmitted by the associated signaling channels being unique within ports of network elements sending physical frames.

19. The method according to claim 13, wherein the associated signaling channels are unused overhead of a server layer in a physical frame structure of an optical network, a one-to-one correspondence relationship being established between the discriminators transmitted by the associated signaling channels and the channels of the restoration path.

20. The method according to claim 13, wherein the associated signaling channels are HDLC (High-level Data Link Control) protocol signaling channels over multiple overhead bytes.

21. The method according to claim 13, wherein bit compression coding is applied to the discriminators.

22. The method according to claim 13, wherein operating status of the working path is detected through server layer alarm monitoring or channel layer alarm monitoring.

23. The method according to claim 22, wherein the server layer alarm includes at least one of the following alarms: loss of signaling, loss of frame, multiplex section alarm indication, multiplex section remote alarm indication, and multiplex section signal degrade alarm in an SDH/SONET, loss of signal and remote alarm indication in an OTN; the channel layer alarm includes at least one of the following alarms: channel/virtual path alarm indication, channel error threshold-crossing, remote defect indication and remote error indication in an SDH/SONET, loss of signal, signal degrade and remote alarm indication in an OTN.

24. The method according to claim 13, further comprising, after the working path is repaired, a step of releasing the cross connection on the restoration path, which in turn includes steps of:

1) switching a service from a receiving side to the working path and transmitting an idle discriminator to an intermediate network element along the restoration path by the ingress network element;

2) searching a channel according to an original discriminator value of the restoration path by the intermediate network element after receiving the idle discriminator, and transmitting an idle discriminator to the channel; repeating step 2) until the egress network element receives the idle discriminator;

3) accomplishing cross connection switching in a forward direction of a bidirectional cross connection for switching a bidirectional service to the working path in both the forward direction and a reverse direction of the bidirectional cross connection, and removing a reverse bridge of the egress network element in the reverse direction of the bidirectional cross connection;

4) transferring an idle status overhead along the reverse direction of the restoration path by the egress network element, removing the cross connections of the intermediate network element in both the forward direction and the reverse direction of the bidirectional cross connection, and removing a bridge at a transmitting side of the ingress network element.

* * * * *